United States Patent
Gaedt et al.

(10) Patent No.: US 10,723,656 B2
(45) Date of Patent: Jul. 28, 2020

(54) CONSTRUCTION CHEMICAL COMPOSITIONS COMPRISING A BISULFITE ADDUCT OF GLYOXYLIC ACID

(71) Applicant: BASF SE, Ludwigshafen am Rhein (DE)

(72) Inventors: Torben Gaedt, Trostberg (DE); Joachim Dengler, Trostberg (DE); Oliver Mazanec, Trostberg (DE); Christoph Hesse, Trostberg (DE); Sebastian Seufert, Trostberg (DE)

(73) Assignee: BASF SE, Ludwigshafen am Rhein (DE)

(*) Notice: Subject to any disclaimer, the term of this patent is extended or adjusted under 35 U.S.C. 154(b) by 30 days.

(21) Appl. No.: 16/308,122

(22) PCT Filed: Jun. 9, 2017

(86) PCT No.: PCT/EP2017/064175
§ 371 (c)(1),
(2) Date: Dec. 7, 2018

(87) PCT Pub. No.: WO2017/212045
PCT Pub. Date: Dec. 14, 2017

(65) Prior Publication Data
US 2019/0177223 A1 Jun. 13, 2019

(30) Foreign Application Priority Data
Jun. 9, 2016 (EP) .................... 16173719

(51) Int. Cl.
| *C04B 24/16* | (2006.01) |
| *C04B 28/04* | (2006.01) |
| *C04B 28/14* | (2006.01) |
| *C04B 28/06* | (2006.01) |
| *C04B 28/16* | (2006.01) |
| *C04B 22/10* | (2006.01) |
| *C04B 24/18* | (2006.01) |
| *C04B 24/22* | (2006.01) |
| *C04B 24/26* | (2006.01) |
| *C04B 103/24* | (2006.01) |
| *C04B 111/62* | (2006.01) |
| *C04B 111/00* | (2006.01) |
| *C04B 111/72* | (2006.01) |
| *C04B 111/60* | (2006.01) |
| *C04B 103/40* | (2006.01) |

(52) U.S. Cl.
CPC ............. *C04B 24/16* (2013.01); *C04B 22/10* (2013.01); *C04B 24/18* (2013.01); *C04B 24/226* (2013.01); *C04B 24/2647* (2013.01); *C04B 28/04* (2013.01); *C04B 28/06* (2013.01); *C04B 28/065* (2013.01); *C04B 28/145* (2013.01); *C04B 28/16* (2013.01); *C04B 2103/24* (2013.01); *C04B 2103/408* (2013.01); *C04B 2111/00155* (2013.01); *C04B 2111/00482* (2013.01); *C04B 2111/00637* (2013.01); *C04B 2111/00672* (2013.01); *C04B 2111/60* (2013.01); *C04B 2111/62* (2013.01); *C04B 2111/72* (2013.01)

(58) Field of Classification Search
CPC ......... C04B 22/10; C04B 24/16; C04B 24/18; C04B 24/22; C04B 24/226; C04B 24/2647; C04B 28/04; C04B 28/06; C04B 28/065; C04B 28/16; C04B 28/145; C04B 40/0608; C04B 40/065; C04B 2103/24; C04B 2103/408; C04B 2111/00155; C04B 2111/00482; C04B 2111/00637; C04B 2111/00672; C04B 2111/60; C04B 2111/62; C04B 2111/72
See application file for complete search history.

(56) References Cited

U.S. PATENT DOCUMENTS

| 4,430,469 A | 2/1984 | Bürge et al. |
| 5,041,440 A | 8/1991 | Kubota et al. |
| 5,685,903 A | 11/1997 | Stav et al. |
| 6,555,683 B1 | 4/2003 | Weichmann et al. |
| 6,827,776 B1 | 12/2004 | Boggs et al. |
| 7,338,990 B2 | 3/2008 | Lettkeman et al. |
| 10,151,980 B2 * | 12/2018 | Baron ............... G03F 7/091 |
| 2011/0136946 A1 | 6/2011 | Kono et al. |
| 2013/0023606 A1 | 1/2013 | Kono et al. |
| 2017/0107153 A1 | 4/2017 | Mazanec et al. |

FOREIGN PATENT DOCUMENTS

| CA | 2172004 A1 | 9/1996 |
| CH | 686 186 A5 | 1/1996 |
| DE | 44 11 797 A1 | 10/1995 |
| EP | 0 413 843 A1 | 2/1991 |
| EP | 0 753 488 A2 | 1/1997 |

(Continued)

OTHER PUBLICATIONS

International Search Report dated Jul. 31, 2017 in PCT/EP2017/064175, 4 pages.

(Continued)

*Primary Examiner* — Anthony J Green

(74) *Attorney, Agent, or Firm* — Oblon, McClelland, Maier & Neustadt, L.L.P.

(57) ABSTRACT

The present invention relates to construction chemical compositions comprising a bisulfite adduct of glyoxylic acid or a salt or mixed salt thereof and an inorganic binder. The composition is useful as a hydration control agent of the inorganic binder.

21 Claims, No Drawings

(56) References Cited

FOREIGN PATENT DOCUMENTS

| | | |
|---|---|---|
| EP | 0 894 811 A1 | 2/1999 |
| EP | 1 851 256 | 11/2007 |
| EP | 2 463 314 A1 | 6/2012 |
| FR | 2 471 955 A1 | 6/1981 |
| JP | 54-6013 A | 1/1979 |
| WO | WO 00/23395 A1 | 4/2000 |
| WO | WO 2006/089759 A1 | 8/2006 |
| WO | WO 2008/012438 A2 | 1/2008 |
| WO | WO 2009/103579 A1 | 8/2009 |
| WO | WO 2010/026155 A1 | 3/2010 |
| WO | WO 2014/114782 A1 | 7/2014 |
| WO | WO 2014/114784 A1 | 7/2014 |
| WO | WO 2015/091461 A1 | 7/2015 |
| WO | WO 2015/150473 A1 | 10/2015 |

OTHER PUBLICATIONS

Extended European Search Report dated Dec. 14, 2016 in European Patent Application No. 16173719.2, 3 pages.

\* cited by examiner

CONSTRUCTION CHEMICAL COMPOSITIONS COMPRISING A BISULFITE ADDUCT OF GLYOXYLIC ACID

The present invention concerns construction chemical compositions comprising a bisulfite adduct of glyoxylic acid, and the use of the construction chemical compositions.

Ternary binder systems containing Ordinary Portland Cement (OPC), calcium aluminate cement and calcium sulfate based binders are frequently used, for example in self-levelling underlayments (SLU), and are described in "Lamberet S., 2004, Durability of ternary binder systems based on Portland Cement, calcium aluminate cement and calcium sulfate, Thèse École polytechnique fédérale de Lausanne EPFL, no 3151 (2005)" and "Zurbriggen, R.; Bühler, E.; Lang, J. (2006). Mixed-binder based self-levelling flooring compounds: Critical formulations—the reason for typical damages. 16. Ibausil Weimar".

Binary binder systems, which contain Ordinary Portland Cement (OPC) and calcium sulfate based binders are for example described in the U.S. Pat. No. 5,685,903 in applications for floor underlayments, floor and road patching materials and fiberboards. The construction materials contain from about 20 weight % to about 75 weight % calcium sulfate beta-hemihydrate, about 10 weight % to about 50 weight % of a cement, silica fume, pozzolanic aggregate and as a setting retarder a natural protein-based material.

U.S. Pat. No. 4,661,159 discloses cementitious floor underlayments including beta gypsum (45 to 55 weight %), alpha gypsum (20 to 30 weight %), Portland cement (about 20 weight %) and fly ash (about 5 weight %), in each case the weight percentages are given as values referring to the total dry weight of the composition. As setting retarder sodium citrate is disclosed. The compositions are said to be quick-setting, non-combustible, non-water-permeable and easy to work.

U.S. Pat. No. 7,338,990 B2 discloses a mixture for preparing a slurry that hydrates to form an exterior gypsum cement, comprising 30 to 70 weight % hydraulic cement, 30 to 70 weight % calcined gypsum and 0.05 to 2.5 weight % polycarboxylate dispersant, wherein the dispersant is based on oxyalkyleneglycol-alkyl ethers and unsaturated dicarboxylic acid derivatives. The mixtures allow improved production of molded articles due to the decreased expansion of the casted material and at the same time improved mechanical strength.

U.S. Pat. No. 6,827,776 discloses a method of accelerating the setting time of a hydraulic cement mixture with an accelerator slurry having an alkaline pH. The slurry comprises a pH balancing agent such as an alkali or alkaline earth metal hydroxide or a salt of a hydroxycarboxylic acid such as citric acid, malic acid, glycolic acid or glyoxylic acid.

WO 00/23395 discloses a process for preparing a permeable aerated mortar by mixing a motar material containing a rapidly hardening cement with a foam. The material may contain a conventional set retarder such as citric acid, gluconic acid, tartaric acid, malic acid, and salts thereof, sodium carbonate, potassium carbonate or sodium bicarbonate.

JP S546013A describes cement compositions comprising an adduct of glyoxal with sodium hydrogen sulphite, a calcium compound and an emulsion selected from asphalt emulsion, rubber latex and a resin emulsion. The adduct increases pot life and compressive strength of the composition.

FR 2471 955 A1 discloses a process for accelerating the setting and hardening of cement without loss of the mechanical properties by incorporating a reducing agent as setting and hardening accelerating agent such as a bisulfite and/or an aldehyde selected from formaldehyde, glyoxal and homologs thereof.

EP 413 843 A1 discloses the use of the sodium bisulfite adduct of glyoxal for the synthesis of dithiolane derivatives.

Dry mortars of the prior art based on calciumsulfate hemihydrate, anhydrite or aluminate-containing cements often have the disadvantage that they are not satisfying in relation to flowability and development of compressive strength, shrinkage and final strength. Depending on the inorganic binder used a rapidly occurring gypsum formation (in case of calciumsulfate hemihydrate or anhydrite as inorganic binder) or a fast aluminate reaction (in case of aluminate-containing cement) results in a significantly reduced open time of the mortar and, hence, unacceptable processability. Consequently, retarders for the hydration of the anhydrous phases of the inorganic binder have to be added. Retarders according to prior art have the disadvantage that an improved workability of the mortar which is influenced by the dosage of the retarder, is connected with a reduced strength development within 1-2 days.

The problem underlying the invention was therefore to provide a construction chemical composition which solves the problems of the prior art. In particular the compositions should enable a sufficient open time (time until initial setting), a good processability (workability) during said open time (for example measured by flow behaviour of mortar) and fast setting. Furthermore, the composition should enable an improved compressive strength after 24 h as compared to the use of conventional retarders. In particular the construction chemical composition should have a well-balanced property profile.

This problem is solved by providing construction chemical compositions comprising a bisulfite adduct of glyoxylic acid or a salt or mixed salt thereof. The invention therefore relates to a construction chemical composition comprising said bisulfite adduct and an (anhydrous) inorganic binder.

The invention further relates to the use of said composition for modification of the hardening of inorganic binder containing building material formulations and/or for producing building products.

The bisulfite adduct has formula (I)

wherein

R1 is —COOX; and

X is independently selected from H or a cation equivalent $K_a$ wherein K is selected from an alkali metal, alkaline earth metal, zinc, copper, iron, aluminium, ammonium or phosphonium cation, or mixtures thereof and a is 1/n wherein n is the valency of the cation.

If X is a cation equivalent, the resulting compound is a salt which also includes mixed salts. In a further embodiment, the salt is selected from an alkali metal, alkaline earth metal, zinc, copper, iron, aluminium, ammonium or phosphonium salt, preferably from an alkali metal salt such as the sodium or potassium salt.

The bisulfite adducts are commercially available or can be prepared by conventional methods which are known to the skilled person.

In an embodiment, the weight ratio of inorganic binder to bisulfite adduct is selected from one of the following ranges 10:1 to 10000:1, 10:1 to 2000:1, 10:1 to 1000:1, 20:1 to 1000:1, and 40:1 to 500:1.

In a further embodiment, the weight ratio of the inorganic binder to the bisulfite adduct is in the range from 1:10 to 1:10000, preferably 1:10 to 1:1000.

In another embodiment, the inorganic binder is selected from a hydraulic binder or a calcium sulfate-based binder.

In an embodiment, the inorganic binder is selected from calciumsulfate dihydrate, calciumsulfate hemihydrate, anhydrite and/or aluminate-containing cement.

Aluminate-containing cement here means that the cement contains aluminate phases such as tricalcium aluminate ($C_3A$), monocalcium aluminate (CA), tetra aluminate ferrate ($C_4AF$), dodecacalcium heptaaluminate ($C_{12}A_7$), yeelimite ($C_4A_3s$) etc. The amount of alumina (in form of $Al_2O_3$) is ≥1% by weight of the total mass of the aluminate-containing cement as determined by means of X-ray fluorescence (XRF).

In another embodiment, the aluminate-containing cement is selected from CEM cement and aluminate cement, in particular high alumina cement and sulfoaluminate cement, and mixtures thereof. CEM cement is a cement in accordance with the CEM classification as set forth for example in DIN EN 197-1. A preferred cement is ordinary Portland cement (OPC) according to DIN EN 197-1 which may either contain calcium sulfate (<7% by weight) or is essentially free of calcium sulfate (<1% by weight). Another preferred cement is sulfoaluminate cement (calcium sulfoaluminate cement, CSA) or high alumina cement (HAC) according to DIN EN 14647 or a mixture of ordinary Portland cement and aluminate cement, in particular a mixture of ordinary Portland cement and high alumina cement or a mixture of ordinary Portland cement and sulfoaluminate cement or a mixture of ordinary Portland cement, high alumina cement and sulfoaluminate cement.

It has been surprisingly found that the bisulfite adduct according to formula (I) is useful for modifying the hydration of anhydrous inorganic binders resulting in the formation of hydrate phases connected with the hardening of the inorganic binders. In the case of calcium sulfate hemihydrate and anhydrite the formation of gypsum is influenced by the additive according to formula (I). In the case of aluminate-containing cements the additive according to formula (I) is influencing the aluminate reaction. Aluminate reaction means the hydration of aluminate-containing clinker phases: like for example tricalcium aluminate ($C_4A$), monocalcium aluminate (CA), tetra aluminate ferrate ($C_4AF$), dodecacalcium heptaaluminate ($C_{12}A_7$), yeelimite ($C_4A_3s$) under formation of calcium aluminate hydrates. The hydration reactions are described in Lea's Chemistry of Cement and Concrete ($4^{th}$ edition), 2007 on pages 241-274 (hydration of Portland cement) and 722-735 (hydration of calcium aluminate cement). The hydration reaction of aluminate-containing clinker phases is retarded which is required to avoid a too rapid setting of mortar and concrete pastes and to ensure a sufficient open time which allows processing the pastes as desired.

In a further embodiment, the inorganic binder is a calcium sulfate-based binder. In a further embodiment, the calcium sulfate based binder is selected from the group consisting of gypsum, anhydrite, α- and β-hemihydrate, i.e. α-bassanite and β-bassanite, or mixtures thereof. Preferably the calcium sulfate-based binder is α-bassanite and/or β-bassanite.

In an embodiment, where the construction chemical compositions contain an aluminate-containing cement, the compositions may additionally contain at least one calcium sulfate which is selected from the group consisting of calcium sulfate dihydrate, anhydrite, α- and β-hemihydrate, i.e. α-bassanite and β-bassanite, or mixtures thereof. Preferably the calcium sulfate is α-bassanite and/or β-bassanite. In general, calcium sulfate is comprised in an amount of about 1 to about 20 wt %, based on the weight of the aluminate-containing cement.

In an embodiment, the construction chemical compositions additionally contain at least one alkali metal sulfate like potassium sulfate or sodium sulfate, in particular in case the inorganic binder is calcium sulfate hemihydrate or anhydrite.

In a further embodiment, the inorganic binder comprises a mixture of at least one aluminate-containing cement and at least one calcium sulfate-based binder.

In another embodiment, the construction chemical compositions additionally contain at least one additive. The weight ratio bisulfite adduct to additive is, in general, in the range from 10000:1 to 1:10000, preferably 5000:1 to 1:5000, in particular 1000:1 to 1:1000.

Preferably, the additive is selected from at least one of the additives that are detailed in the following.

The construction chemical compositions may contain at least one alkali metal carbonate or alkaline earth metal carbonate, in particular sodium carbonate, potassium carbonate, magnesium carbonate, calcium carbonate and/or a mixed calcium-magnesium carbonate. $(CaMg(CO_3)_2$. Especially the alkaline earth metal carbonates may be present in X-ray amorphous form. The carbonate is, in general, comprised in an amount in the range from about 1 to about 20 wt %, based on the weight of the inorganic binder.

The construction chemical compositions may also contain latent hydraulic binders. For the purposes of the present invention, a "latent hydraulic binder" is preferably a binder in which the molar ratio $(CaO+MgO):SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof, and the "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2 kg^{-1}$, preferably from 300 to 500 $m^2kg^{-1}$. Finer milling gives higher reactivity.

For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO; about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X-ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2g^{-1}$.

Microsilica is a by-product of silicon production or ferrosilicon production, and likewise consists mostly of amorphous $SiO_2$ powder. The particles have diameters of the order of magnitude of 0.1 μm. Specific surface area is of the order of magnitude of from 15 to 30 $m^2g^{-1}$.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly pure metakaolin comprises about 54% by weight of $SiO_2$ and about 46% by weight of $Al_2O_3$.

For the purposes of the present invention, aluminosilicates are the abovementioned reactive compounds based on $SiO_2$ in conjunction with $Al_2O_3$ which harden in an aqueous alkali environment. It is of course not essential here that silicon and aluminium are present in oxidic form, as is the case by way of example in $Al_2Si_2O_7$. However, for the purposes of quantitative chemical analysis of aluminosilicates it is usual to state the proportions of silicon and aluminium in oxidic form (i.e. as "$SiO_2$" and "$Al_2O_3$").

In an embodiment, the latent hydraulic binder is selected from the group consisting of blast furnace slag, microsilica, metakaolin, aluminosilicates, fly ash and mixtures thereof.

The latent hydraulic binder is, in general, comprised in an amount in the range from about 1 to about 30 wt %, based on the weight of the aluminate-containing cement.

Preferably, the compositions comprise at least one dispersant for the inorganic binder. In an embodiment, the dispersant is a polymeric dispersant which has anionic and/or anionogenic groups and polyether side chains, which preferably comprise polyalkylene glycol side chains. The anionic and/or anionogenic groups and the polyether side chains are preferably attached to the backbone of the polymeric dispersant.

The dispersants are in this case more preferably selected from the group of polycarboxylate ethers (PCEs), the anionic group being in the case of PCEs carboxylic groups and/or carboxylate groups, and phosphorylated polycondensates. Most preferable are the polycarboxylate ethers (PCEs).

The PCE is preferably produced by the radical copolymerization of a polyether macromonomer and an acid monomer in a way that at least 45 mol-%, preferably at least 80 mol-% of all structural units of the copolymer were formed by copolymerization of the polyether macromonomer and the acid monomer. The term acid monomer means in particular a monomer comprising anionic and/or anionogenic groups. The term polyether macromonomer means in particular a monomer comprising at least two ether groups, preferably at least two alkylene glycol groups.

The polymeric dispersant preferably comprises as anionic and/or anionogenic group at least one structural unit of the general formulae (Ia), (Ib), (Ic) and/or (Id):

in which
$R^1$ is H or an unbranched or branched $C_1$-$C_4$ alkyl group, $CH_2COOH$ or $CH_2CO$—X—$R^3$;
X is NH—($C_nH_{2n}$) or O—($C_nH_{2n}$) with n=1, 2, 3 or 4, or is a chemical bond, where the nitrogen atom or the oxygen atom is bonded to the CO group;
$R^2$ is OM, $PO_3M_2$, or O—$PO_3M_2$; with the proviso that X is a chemical bond if $R^2$ is OM;
$R^3$ is $PO_3M_2$, or O—$PO_3M_2$;

in which
$R^3$ is H or an unbranched or branched $C_1$-$C_4$ alkyl group;
n is 0, 1, 2, 3 or 4;
$R^4$ is $PO_3M_2$, or O—$PO_3M_2$;

in which
$R^5$ is H or an unbranched or branched $C_1$-$C_4$ alkyl group;
Z is O or NR;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$, and
n is 1, 2, 3 or 4;

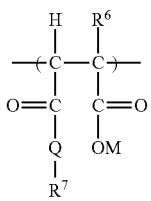
(Id)

in which
$R^6$ is H or an unbranched or branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$;
n is 1, 2, 3 or 4; and
where each M in the above formulae independently of any other is H or a cation equivalent.

Preferable is a composition where the polymeric dispersant comprises as polyether side chain at least one structural unit of the general formulae (IIa), (IIb), (IIc) and/or (IId):

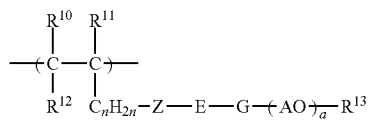
(IIa)

in which
$R^{10}$, $R^{11}$ and $R^{12}$ independently of one another are H or an unbranched or branched $C_1$-$C_4$ alkyl group;
Z is O or S;
E is an unbranched or branched $C_1$-$C_6$ alkylene group, a cyclohexylene group, $CH_2$—$C_5H_{10}$, 1,2-phenylene, 1,3-phenylene or 1,4-phenylene;
G is O, NH or CO—NH; or
E and G together are a chemical bond;
A is an unbranched or branched alkylene with 2, 3, 4 or 5 carbon atoms or $CH_2CH(C_6H_5)$;
n is 0, 1, 2, 3, 4 or 5;
a is an integer from 2 to 350;
$R^{13}$ is H, an unbranched or branched $C_1$-$C_4$ alkyl group, CO—$NH_2$ or $COCH_2$;

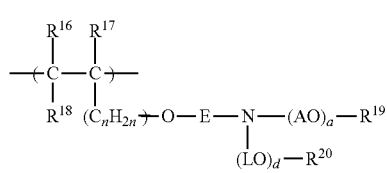
(IIb)

in which
$R^{16}$, $R^{17}$ and $R^{18}$ independently of one another are H or an unbranched or branched $C_1$-$C_4$ alkyl group;

E is an unbranched or branched $C_1$-$C_6$ alkylene group, a cyclohexylene group, $CH_2$—$C_6H_{10}$, 1,2-phenylene, 1,3-phenylene, or 1,4-phenylene, or is a chemical bond;
A is an unbranched or branched alkylene with 2, 3, 4 or 5 carbon atoms or $CH_2CH(C_6H_5)$;
n is 0, 1, 2, 3, 4 and/or 5;
L is $C_xH_{2x}$ with x=2, 3, 4 or 5, or is $CH_2CH(C_6H_5)$;
a is an integer from 2 to 350;
d is an integer from 1 to 350;
$R^{19}$ is H or an unbranched or branched $C_1$-$C_4$ alkyl group;
$R^{20}$ is H or an unbranched $C_1$-$C_4$ alkyl group; and
n is 0, 1, 2, 3, 4 or 5;

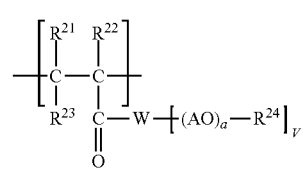
(IIc)

in which
$R^{21}$, $R^{22}$ and $R^{23}$ independently of one another are H or an unbranched or branched $C_1$-$C_4$ alkyl group;
W is O, $NR^{25}$, or is N;
V is 1 if W=O or $NR^{25}$, and is 2 if W=N;
A is an unbranched or branched alkylene with 2 to 5 carbon atoms or $CH_2CH(C_6H_5)$;
a is an integer from 2 to 350;
$R^{24}$ is H or an unbranched or branched $C_1$-$C_4$ alkyl group;
$R^{25}$ is H or an unbranched or branched $C_1$-$C_4$ alkyl group;

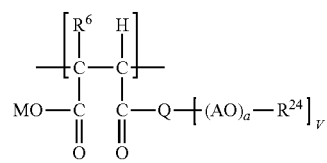
(IId)

in which
$R^6$ is H or an unbranched or branched $C_1$-$C_4$ alkyl group;
Q is $NR^{10}$, N or O;
V is 1 if W=O or $NR^{10}$ and is 2 if W=N;
$R^{10}$ is H or an unbranched or branched $C_1$-$C_4$ alkyl group;
A is an unbranched or branched alkylene with 2 to 5 carbon atoms or $CH_2CH(C_6H_5)$; and
a is an integer from 2 to 350.

In an embodiment, the polymeric dispersant is a phosphorylated polycondensation product comprising structural units (III) and (IV):

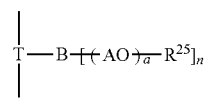
(III)

in which
T is a substituted or unsubstituted phenyl or naphthyl radical or a substituted or unsubstituted heteroaromatic radical having 5 to 10 ring atoms, of which 1 or 2 atoms are heteroatoms selected from N, O and S;

n is 1 or 2;

B is N, NH or O, with the proviso that n is 2 if B is N and with the proviso that n is 1 if B is NH or O;

A is an unbranched or branched alkylene with 2 to 5 carbon atoms or $CH_2CH(C_6H_5)$;

a is an integer from 1 to 300;

$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O and S;

where the structural unit (IV) is selected from the structural units (IVa) and (IVb):

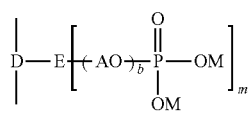

(IVa)

in which

D is a substituted or unsubstituted phenyl or naphthyl radical or a substituted or unsubstituted heteroaromatic radical having 5 to 10 ring atoms, of which 1 or 2 atoms are heteroatoms selected from N, O and S;

E is N, NH or O, with the proviso that m is 2 if E is N and with the proviso that m is 1 if E is NH or O;

A is an unbranched or branched alkylene with 2 to 5 carbon atoms or $CH_2CH(C_6H_5)$;

b is an integer from 0 to 300;

M independently at each occurrence is H or a cation equivalent;

(IVb)

in which

V is a substituted or unsubstituted phenyl or naphthyl radical and is optionally substituted by 1 or two radicals selected from $R^8$, OH, OR, (CO)$R^8$, COOM, COOR$^8$, SO$_3$R$^8$ and NO$_2$;

$R^7$ is COOM, OCH$_2$COOM, SO$_3$M or OPO$_3$M$_2$;

M is H or a cation equivalent; and $R^8$ is $C_1$-$C_4$ alkyl, phenyl, naphthyl, phenyl-$C_1$-$C_4$ alkyl or $C_1$-$C_4$ alkylphenyl.

The polymeric dispersants comprising structural units (I) and (II) can be prepared by conventional methods, for example by free radical polymerization. The preparation of the dispersants is, for example, described in EP0894811, EP1851256, EP2463314; and EP0753488.

In a preferred embodiment, the dispersant is a polymer comprising a sulfonic acid and/or sulfonate group. In an embodiment, the polymeric dispersant cormprising sulfonic acids and/or sulfonates and is selected from the group consisting of lignosulfonates (LGS), melamine formaldehyde sulfonate condensates (MFS), β-naphthalene sulfonic acid condensates (BNS), sulfonated ketone-formaldehyde-condensates, and copolymers comprising sulfo group containing units and/or sulfonate group-containing units and carboxylic acid and/or carboxylate group-containing units.

The lignosulfonates used as polymeric sulfonated dispersants are products, which are obtained as by-products of the paper industry. Such products are described in Ullmann's Encyclopedia of Industrial Chemistry, 5th Ed., Vol. A8, pages 586, 587. They comprise units of the strongly simplified and idealized formula

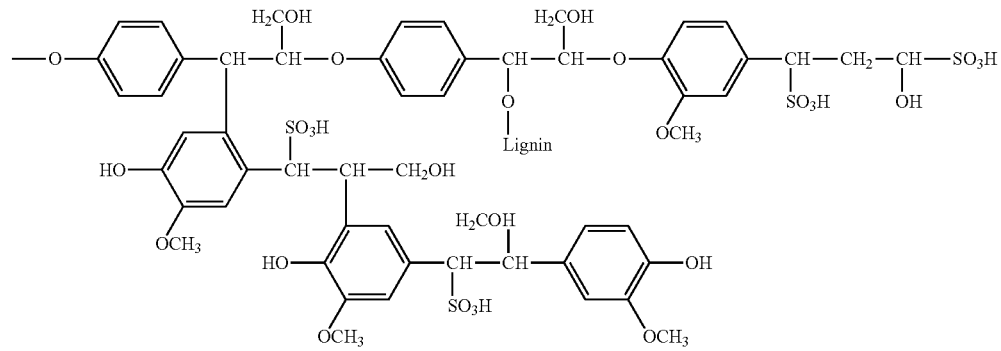

wherein n is usually 5 to 500. Lignosulfonates have usually molecular weights between 2.000 and 100.000 g/mol. Generally they are present in the form of their sodium-, calcium-, and/or magnesium salts. Examples for suitable lignosulfonates are the products marketed under the trade name Borresperse of the Norwegian company Borregaard LignoTech.

The melamine-formaldehyde-sulfonate condensates (also called MFS-resins) and their preparation are for example described in CA 2 172 004 A1, DE 44 11 797 A1, U.S. Pat. Nos. 4,430,469, 6,555,683 and CH 686 186, as well as in "Ullmann's Encyclopedia of Industrial Chemistry, 5th Ed., Vol. A2, page 131" and "Concrete Admixtures Handbook—Properties, Science and Technology, 2nd Ed., pages 411, 412". Preferred melamine-formaldehyde-sulfonate condensates comprise (strongly simplified and idealized) units of the formula

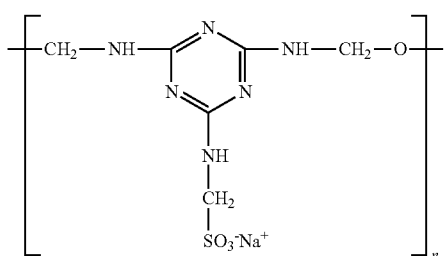

Melamine formaldehyde
sulfite (PMS)

wherein n is typically a number from 10 to 300. The molecular weight is preferably in the region from 2.500 to 80.000 g/mol. An example for melamine-formaldehyde-sulfonate condensates are products marketed by the company BASF Construction Solutions GmbH under the trade name Melment®.

In addition to the sulfonated melamine units additional monomers can be co-condensated. In particular urea is suitable. Furthermore aromatic building units like gallic acid, aminobenzene sulfonic acid, sulfanilic acid, phenol sulfonic acid, aniline, ammonium benzoic acid, dialkoxybenzene sulfonic acid, dialkoxybenzoic acid, pyridine, pyridine monosulfonic acid, pyridine disulfonic acid, pyridine carboxylic acid and pyridine dicarboxylic acid can be co-condensated into the melamine-formaldehyde-sulfonate condensates.

The sulfonated ketone-formaldehyde are products in which as ketone component a mono- or diketone is used. Preferably acetone, butanone, pentanone, hexanone or cyclohexanone are built into the polymer. Such condensates are known and for example described in WO 2009/103579. Preferable are sulfonated acetone-formaldehyde-condensates. They comprise typically units of the formula (according to J. Plank et al., J. Appl. Poly. Sci. 2009, 2018-2024):

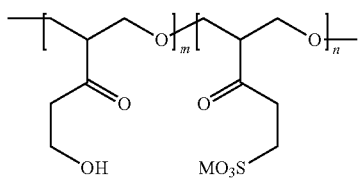

wherein m and n are typically an integer from 10 to 250, M is an alkali metall ion, for example Na$^+$, and the ratio of m:n is generally in the region from about 3:1 to about 1:3, in particular from about 1, 2:1 to about 1:1, 2. Examples for suitable acetone-formaldehyde-condensates are products, which are marketed by the company BASF Construction Solutions GmbH under the trade name Melcret® K1L.

Furthermore aromatic building units like gallic acid, aminobenzene sulfonic acid, sulfanilic acid, phenol sulfonic acid, aniline, ammonium benzoic acid, dialkoxybenzene sulfonic acid, dialkoxybenzoic acid, pyridine, pyridine monosulfonic acid, pyridine disulfonic acid, pyridine carboxylic acid and pyridine dicarboxylic acid can be co-condensated.

The β-naphthaline-formaldehyde-condensates (BNS) are products, which are obtained by a sulfonation of naphthaline followed by a polycondensation with formaldehyde. Such products are described amongst others in "Concrete Admixtures Handbook—Properties, Science and Technology, 2nd Ed., pages 411-413" and "Ullmann's Encyclopedia of Industrial Chemistry, 5th Ed., Vol. A8, pages 587, 588". They comprise units of the formula

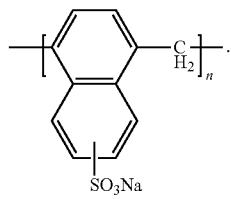

Typically the molecular weight ($M_w$) is from 1.000 to 50.000 g/mol.

Examples for suitable β-naphthaline-formaldehyde-condensates are the products marketed by the company BASF Construction Solutions GmbH under the trade name Melcret® 500 L. Furthermore aromatic building units like gallic acid, aminobenzene sulfonic acid, sulfanilic acid, phenol sulfonic acid, aniline, ammonium benzoic acid, dialkoxybenzene sulfonic acid, dialkoxybenzoic acid, pyridine, pyridine monosulfonic acid, pyridine disulfonic acid, pyridine carboxylic acid and pyridine dicarboxylic acid can be co-condensated.

In a further embodiment, the dispersant is a copolymer comprising sulfo group containing units and/or sulfonate group-containing units and carboxylic acid and/or carboxylate group-containing units. In an embodiment, the sulfo or sulfonate group containing units are units derived from vinylsulfonic acid, methallylsulfonic acid, 4-vinylphenylsulfonic acid or are sulfonic acid-containing structural units of formula

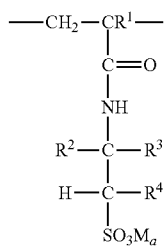

wherein
$R^1$ represents hydrogen or methyl
$R^2$, $R^3$ and $R^4$ independently of each other represent hydrogen, straight or branched $C_1$-$C_6$-alkyl or $C_6$-$C_{14}$-aryl,
M represents hydrogen, a metal cation, preferably a monovalent or divalent metal cation, or an ammonium cation
a represents 1 or 1/valency of the cation, preferably ½ or 1.

Preferred sulfo group containing units are derived from monomers selected from vinylsulfonic acid, methallylsulfonic acid, and 2-acrylamido-2-methylpropylsulfonic acid (AMPS) with AMPS being particularly preferred.

The carboxylic acid or carboxylate containing units are preferably derived from monomers selected from acrylic acid, methacrylic acid, 2-ethylacrylic acid, vinyl acetic acid, crotonic acid, maleic acid, fumaric acid, itaconic acid, citraconic acid, and in particular acrylic acid and methacrylic acid.

The sulfo group containing copolymer in general has a molecular weight M, in the range from 1000 to 50.000, preferably 1500 to 30.000, as determined by aqueous gel permeation chromatography.

In an embodiment, the molar ratio between the sulfo group containing units and carboxylic acids containing units is, in general, in the range from 5:1 to 1:5, preferably 4:1 to 1:4.

Preferably the (co)polymer having carboxylic acid groups and/or carboxylate groups and sulfonic acid groups and/or sulfonate groups has a main polymer chain of carbon atoms and the ratio of the sum of the number of carboxylic acid groups and/or carboxylate groups and sulfonic acid groups and/or sulfonate groups to the number of carbon atoms in the main polymer chain is in the range from 0.1 to 0.6, preferably from 0.2 to 0.55. Preferably said (co)polymer can be obtained from a free-radical (co)polymerisation and the carboxylic acid groups and/or carboxylate groups are derived from monocarboxylic acid monomers.

Preferred is a (co)polymer, which can be obtained from a free-radical (co)polymerisation and the carboxylic acid groups and/or carboxylate groups are derived from the monomers acrylic acid and/or methacrylic acid and the sulfonic acid groups and/or sulfonate groups are derived from 2-acrylamido-2-methylpropanesulfonic acid. Preferably the weight average molecular weight $M_w$ of the (co)polymer(s) is from 8 000 g/mol to 200 000 g/mol, preferably from 10 000 to 50 000 g/mol. The weight ratio of the (co)polymer or (co)polymers to the calcium silicate hydrate is preferably from 1/100 to 4/1, more preferably from 1/10 to 2/1, most preferably from 1/5 to 1/1.

It is also possible to use mixtures of the before mentioned dispersants, for example mixtures of lignosulfonates (LGS), melamine formaldehyde sulfonate condensates (MFS), β-naphthalene sulfonic acid condensates (BNS), copolymers comprising sulfo group containing units and/or sulfonate group-containing units and carboxylic acid and/or carboxylate group-containing units, sulfonated keton-formaldehyde-condensates, polycarboxylate ethers (PCE) and/or phosphorylated polycondensates. A preferred mixture comprises copolymers comprising sulfo group containing units and/or sulfonate group-containing units and carboxylic acid and/or carboxylate group-containing units and/or phosphorylated polycondensates.

In an embodiment, the dispersant is a) a non-ionic copolymer for extending workability to the construction chemical compositions in the form of a paste (cementitious mixture), wherein the copolymer comprises residues of at least the following monomers: Component A comprising an ethylenically unsaturated carboxylic acid ester monomer comprising a moiety hydrolysable in the cementitious mixture, wherein the hydrolysed monomer residue comprises an active binding site for a component of the cementitious mixture; and Component B comprising an ethylenically unsaturated carboxylic acid ester or alkenyl ether monomer comprising at least one $C_{2-4}$ oxyalkylene side group of 1 to 350 units or b) a phosphonate-containing polymer of the formula

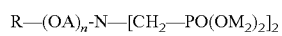

wherein
R is H or a saturated or unsaturated hydrocarbon group, preferably a $C_1$ to $C_{15}$ radical,
A is the same or different and independently from each other an alkylene with 2 to 18 carbon atoms, preferably ethylene and/or propylene, most preferably ethylene,
N is an integer from 5 to 500, preferably 10 to 200, most preferably 10 to 100, and
M is H, an alkali metal, ½ alkaline earth metal and/or amine.

In an embodiment, the construction chemical compositions additionally include other additives (retarders), such as hydroxycarboxylic acids and salts thereof, for example citric acid, tartaric acid, or gluconic acid, water-soluble organic carbonates such as ethylene carbonate, propylene carbonate, trimethylene carbonate, glycerol carbonate, dimethyl carbonate, or di(hydroxyethyl)carbonate, inorganic carbonates, such as alkali metal carbonates, like sodium carbonate, boric acid, organic phosphates, such as 1-hydroxyethan-(1,1-diphosphonsäure) (HEDP), etc.

In another embodiment, the compositions comprise at least one hardening accelerator. A preferred hardening accelerator is a calcium-silicate-hydrate (C—S—H) based hardening accelerator for compositions comprising OPC.

The calcium-silicate-hydrate may contain foreign ions, such as magnesium and aluminium. The calcium-silicate-hydrate can be preferably described with regard to its composition by the following empirical formula:

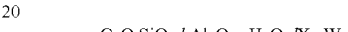

X is an alkali metal
W is an alkaline earth metal

| | | |
|---|---|---|
| $0.1 \le a \le 2$ | preferably | $0.66 \le a \le 1.8$ |
| $0 \le b \le 1$ | preferably | $0 \le b \le 0.1$ |
| $1 \le c \le 6$ | preferably | $1 \le c \le 6.0$ |
| $0 \le d \le 1$ | preferably | $0 \le d \le 0.4$ or 0.2 |
| $0 \le e \le 2$ | preferably | $0 \le e \le 0.1$ |

Calcium-silicate-hydrate can be obtained preferably by reaction of a calcium compound with a silicate compound, preferably in the presence of a polycarboxylate ether (PCE). Such products containing calcium-silicate-hydrate are for example described in WO 2010/026155 A1, EP 14198721, WO 2014/114784 or WO 2014/114782.

Preferable is a composition, preferably dry mortar composition, in which the calcium-silicate-hydrate based hardening accelerator for cementitious compositions is a powder product.

Powder products are advantageous as they are naturally high in contents of calcium-silicate-hydrate. In particular there are no compatibility problems with for example cement or other hydraulic binders, which might react with water from the aqueous calcium-silicate-hydrate containing suspension during storage.

The water content of the calcium-silicate-hydrate based hardening accelerator in powder form is preferably from 0.1 weight % to 5.5 weight % with respect to the total weight of the powder sample. Said water content is measured by putting a sample into a drying chamber at 80° C. until the weight of the sample becomes constant. The difference in weight of the sample before and after the drying treatment is the weight of water contained in the sample. The water content (%) is calculated as the weight of water contained in the sample divided with the weight of the sample.

A composition is preferred in which the calcium-silicate-hydrate based hardening accelerator is an aqueous suspension. The water content of the aqueous suspension is preferably from 10 weight % to 95 weight %, preferably from 40 weight % to 90 weight %, more preferably from 50 weight % to 85 weight %, in each case the percentage is given with respect to the total weight of the aqueous suspension sample. The water content is determined in an analogous way as described in the before standing text by use of a drying chamber.

Further useful hardening accelerators for aluminate-containing cements are calcium formate, calcium nitrate, calcium chloride, calcium hydroxide, lithium carbonate and lithium sulfate.

Further useful hardening accelerators for inorganic binders are selected from calciumsulfate hemihydrate and/or anhydrite are potassium sulfate, sodium sulfate and ground gypsum (known to the skilled person as ball mill accelerator).

The construction chemical composition may additionally contain an essentially aluminate-free cement, anionic starch ethers, cellulose ethers, a redispersible polymer powder, and fillers or a mixture of two or more thereof. The term "essentially free" means here less than 5 wt %, preferably less than 3 wt % and in particular less than 1 wt %, based on the weight of the aluminate-containing cement.

An anionic starch ether is in particular carboxymethyl starch ether. Cellulose ethers are preferably selected from the group consisting of methylcellulose, ethylcellulose, propylcellulose, methylethylcellulose, hydroxyethylcellulose (HEC), hydroxypropylcellulose (HPC), hydroxyethylhydroxypropylcellulose, methylhydroxyethylcelluose (MHEC), methylhydroxypropylcelluose (MHPC) and propylhydroxypropylcellulose or mixtures of two or more thereof and in particular from the group consisting of carboxymethyl cellulose, methyl cellulose, methyl hydroxypropyl cellulose, methyl hydroxyethyl cellulose or mixtures of two or more thereof.

Redispersible polymer powders are preferably selected from the group consisting of vinyl acetate polymer, vinyl acetate-ethylene copolymer, vinyl acetate-vinyl ester copolymer and/or vinyl acetate-vinyl ester-ethylene copolymer, with the vinyl ester monomers in each case being selected from the group consisting of vinyl laurate, vinyl pivalate and vinyl versatates, vinyl acetate-acrylic ester copolymer, vinyl acetate-acrylic ester-ethylene copolymer, styrene-butadiene copolymer and styrene-acrylic ester copolymer, with the acrylic esters in each case being esters with branched or linear alcohols containing from 1 to 10 carbon atoms and in particular from the group consisting of styrene acrylate copolymer, polyvinyl acetate, styrene butadiene copolymer or mixtures of two or more thereof.

Fillers are preferably inert materials, which do not act as binder and basically do not dissolve in water. The solubility in water is preferably below 3 g/l at 20° C. and normal pressure. Preferred fillers are limestone, quartz flower, sand, silica dust and basalt powder. Fillers can be preferably present in the composition from 1 weight % to 80 weight %, preferably from 10 weight % to 80 weight %, more preferably 30 weight % to 70 weight % with respect to the total weight of the composition.

In an embodiment, the construction chemical composition is in form of a powder mixture.

In another embodiment, the invention relates to a construction chemical composition comprising
a) the bisulfite adduct of the invention as defined above, and
b) ordinary Portland cement.

The content of a) in this embodiment is 0.01 wt.-%-5.0 wt.-%, preferably 0.05 wt.-%-5.0 wt.-%, by weight of b).

In another embodiment, the invention relates to a construction chemical composition comprising
a) the bisulfite adduct of the invention as defined above, and
b) calcium sulfate hemihydrate or anhydrite.

The content of a) in this embodiment is 0.01 w-L-%-5.0 wt.-%, preferably 0.05 wt.-%-5.0 wt.-%, by weight of b).

In another embodiment, the invention-relates to a construction chemical composition comprising
a) the bisulfite adduct of the invention as defined above,
b) Portland cement, or calcium sulfate, in particular calcium sulfate dihydrate, calcium sulfate hemihydrate or anhydrite and
c) aluminate cement, in particular high alumina cement and sulfoaluminate cement and mixtures thereof.

The content of a) in this embodiment is 0.01 wt.-%-5.0 wt.-%, preferably 0.05 wt.-%-5.0 wt.-%, by weight of sum of b) and c). The content of the sum of b) and c) in the construction chemical composition is 10-95 wt.-%. The weight ratio b)/c) is 1/99 1 to 99/1, preferably 5/95 to 95/5.

In another embodiment, the invention relates to a construction chemical composition comprising
a) the bisulfite adduct of the invention as defined above,
b) Portland cement,
c) aluminate cement, in particular high alumina cement and sulfoaluminate cement and mixtures thereof; and
d) calcium sulfate, in particular calcium sulfate dihydrate, calcium sulfate hemihydrate or anhydrite:

The content of a) in this-embodiment is 0.01 wt.-%-5.0 wt.-%, preferably 0.05 wt.-%-5.0 wt.-%, by weight of sum of b), c), and d). The content of the sum of b), c), and d) in the construction chemical composition is 10-95 wt.-%. The weight ratio b)/c) is 1199 1 to 99/1, preferably 5/95 to 95/5. The weight ratio c)/d) is 100/1 to 2/1.

In another embodiment, the invention relates to a construction chemical composition comprising
a) the bisulfite adduct of the invention as defined above,
b) Portland cement,
c) aluminate cement, in particular high alumina cement and sulfoaluminate cement and mixtures thereof; and:
d) a copolymer comprising sulfo group containing units and carboxylic acids containing units as defined above.

The content of a) in this embodiment is 0.01 wt.-%-5.0 wt.-%, preferably 0.05 wt.-% 5.0 wt.-%, by weight of sum of b) and c). The content of d) is 0.01 wt.-%-5.0 wt.-% by weight of sum of b) and c). The content of the sum of b) and c) in the construction chemical composition is 10-95 wt.-%. The weight ratio b)/c) is 1199 1 to 9911, preferably 5/95 to 95/5.

In another embodiment, the invention relates to a construction chemical composition comprising
a) the bisulfite adduct of the invention as defined above,
b) Portland cement,
c) aluminate cement, in particular high alumina cement and sulfoaluminate cement and mixtures thereof;
d) calcium sulfate, in particular calcium sulfate dihydrate, calcium sulfate hemihydrate or anhydrite; and
e) a copolymer comprising sulfo group containing units and carboxylic acids containing units as defined above.

The content of a) in this embodiment is 0.01 wt.-%-5.0 wt.-%, preferably 0.05 wt.-%-5.0 wt.-%, by weight of sum of b), c), and d). The content of e) is 0.01 wt.-%-5.0 wt.-% by weight of sum of b), c), and d). The content of the sum of b), c), and d) in the construction chemical composition is 10-95 wt.-%. The weight ratio b)/c) is 1/99 to 99/1, preferably 5/95 to 95/5. The weight ratio c)/d) is 10011 to 2/1.

The invention also concerns the use of the construction chemical composition of the invention as a modifier for the hardening process of inorganic binder containing building material formulations and/or for producing building products, in particular for concretes such as on-site concrete, finished concrete parts, pre-cast concrete parts, concrete goods, cast concrete stones, concrete bricks, in-situ concrete, sprayed concrete (shotcrete), ready-mix concrete, air-placed concrete, concrete repair systems, industrial cement flooring, one-component and two-component sealing slurries, screeds, filling and self-levelling compositions, such as joint fillers or self-levelling underlayments, adhesives, such as building or construction adhesives, thermal insulation composite system adhesives, tile adhesives, renders, plasters, adhesives, sealants, coating and paint systems, in particular for tunnels, waste water drains, splash protection and condensate lines, screeds, mortars, such as dry mortars, sag resistant, flowable or self-levelling mortars, drainage mortars, or repair mortars, grouts, such as joint grouts, non shrink grouts, tile grouts, wind-mill grouts, anchor grouts, flowable or self-levelling grouts, ETICS (external thermal insulation composite systems), EIFS grouts (Exterior Insulation Finishing Systems), swelling explosives, waterproofing membranes, cementitious foams or gypsum wall boards.

In an embodiment, the weight ratio of the inorganic binder to the bisulfite adduct of the invention is in the range from 10:1 to 10000:1.

The following examples illustrate the invention.

Materials:

Dispersant 1

Synthesized as follows: 190 g of water were poured into a three-necked flask. 90 g of AMPS (2-acrylamido-2-methylpropanesulfonic acid, 31 g of acrylic acid and 1.6 g of 3-mercaptopropionic acid were added at 30° C. the pH of the reaction mixture was adjusted to 3. Then, 2 g of Waco V 50 (2,2'-azobis(2-amidinopropane)dihydrochloride; available from Sigma-Aldrich) were added and the solution was heated to 80° C. and stirred for 2 h at this temperature.

Dispersant 2

A comb polymer comprising ethoxylated Hydroxybutylvinyl ether (3000 g/mol) and acrylic acid in a ratio of 1/10.

Dispersant 3

A comb polymer comprising ethoxylated Hydroxybutylvinyl ether (3000 g/mol) and acrylic acid in a ratio of 1/3.

Dispersant 4

A comb polymer comprising ethoxylated Hydroxybutylvinyl ether (5000 g/mol) and acrylic acid in a ratio of 1/6.

Dispersant 5

Polymer synthesized according to the polycondensation method disclosed in WO2015091461 A1; starting materials and reaction conditions as given in Table 1; Example 7.

The molecular weights of the polymers were determined the gel permeation chromatography method as described below:

Column combination: OH-Pak SB-G, OH-Pak SB 804 HQ and OH-Pak SB 802.5 HQ by Shodex, Japan; eluent: 80 vol.-% aqueous solution of $HCO_2NH_4$ (0.05 mol/l) and 20 vol.-% acetonitrile; injection volume 100 µl; flow rate 0.5 ml/min. the molecular weight calibration was performed with poly(styrene sulfonate) standards for the UV detector and poly(ethyleneoxide) standards for the RI detector. Both standards were purchased from PSS Polymer Standards Service, Germany. The molecular weight of the polymers was determined on the basis of UV detection.

Additive 1 (Bisulfite Adduct of the Invention)

Additive of the invention which is synthesized as follows:

148 g glyoxylic acid hydrate (50% in water) were charged into a reaction vessel and mixed with 594 g ethanol. 380 g sodium pyrosulfite ($Na_2S_2O_5$) dissolved in 750 g of water were then added to the mixture. After stirring for 4 h the obtained suspension was cooled to 1° C. and allowed to stand for 24 h. The product crystallized and was isolated and dried. It was characterized by means of NMR.

Additive 2 (Comparative)

Tartaric acid (BCK Bau-Chemie-Kontor GmbH).

Additive 3 (Comparative Bisulfite Adduct)

Bisulfite adduct of glyoxal (comparative additive according to JP 19770071518)

Cement 1: non-sulfated Portland cement (Type CEM I 52.5 N, Blaine value: 4100 $cm^2/g$).

Cement 2: Ordinary Portland cement (OPC) (CEM I 52.5 N, Blaine value: 4000 $cm^2/g$).

Cement 3: Alkali-rich ordinary Portland cement (OPC) (CEM I 42.5 N, Blaine value: 3400 $cm^2/g$).

Cement 4: Alkali-rich ordinary Portland cement (OPC) (CEM I 52.5 N, Blaine value: 3600 $cm^2/g$).

EXAMPLE 1: MORTAR COMPOSITION WITH IMPROVED FLOW PROPERTIES AND SUFFICIENT 24 H STRENGTH

The cement mortar investigated was composed by 25 wt.-% inorganic binder and 75 wt.-% norm sand (according EN 196-1).

Cement 1 was mixed with 10 wt.-% sodium carbonate. The resulting mixture was used as inorganic binder in experiments V1, V2, and V3.

For experiments V4, V5, and V6 cement 2 was used as inorganic binder.

The water/inorganic binder ratio was 0.5. The retarder (inventive or comparative) was added in powdered form in an amount of 0.5 wt.-% by weight of inorganic binder (summarized in Table 1).

The production of the cement mortar was done according to EN. 196-1:2005 in a mortar mixer with a batch volume of 5 L. The inorganic binder, the additive (if used), and water were placed into the mixing vessel and the mixing was started at 140 rpm of the mixer: After 30 s of mixing the norm sand was added slowly during 30 s. After complete addition of the norm sand the mixer speed was set to 285 rpm and mixing was continued for another 30 s. After that step the mixing was stopped for 90 s. Within the first 30 s of this break of mixing the mortar attached to the wall of the vessel was removed and given to the mortar again. After the break of 90 s the mixing was continued at a mixer speed of 285 rpm. The total mixing time was 4 minutes.

The spread of the mortar was determined according to EN 1015-3 directly after the end of mixing (value at 4 min) and 15 minutes after the beginning of mixing (value at 15 min). The results are given in table 1.

TABLE 1

| Mortar | Type | Additive no. | Spread (cm) 4 min | Spread (cm) 15 min | Strength after 24 h[1] BS (MPa) | Strength after 24 h[1] CS (MPa) |
|---|---|---|---|---|---|---|
| V1 | Ref | — | 10.0 | 10.0 | n.d. | n.d. |
| V2 | Inv | 1 | 21.8 | 21.0 | 4.4 | 15.8 |
| V3 | Ref | 2 | 20.9 | 21.0 | 1.1 | 3.5 |
| V4 | Ref | — | 19.5 | 17.0 | 4.5 | 19.4 |
| V5 | Inv | 1 | 21.3 | 21.2 | 2.8 | 11.6 |
| V6 | Ref | 2 | 10.0 | 10.0 | 0.9 | 2.8 |

BS-bending strength, CS-compressive strength, n.d.-not determinable
[1] determined as described in EN 196-1:2005

The results demonstrate the advantage of the additive 1 (according to the invention) in comparison to tartaric acid (prior art): In experiments V1 to V3 using cement 1 both additives provide a strong increase of the spread whereas the strength is much higher after 24 h when using additive 1 (according to the invention).

When using cement 2 (experiments V4 to V6) additive 1 strongly increases the spread whereas the use of tartaric acid results in a stiffening of the mortar. Furthermore, the use of additive 1 significantly improves the 24 h strength compared to the use of tartaric acid.

EXAMPLE 2

The following experiments were carried out:

For experiments 1-21 cement 2 was used as inorganic binder and as filler norm sand was used. The cement mortar investigated was composed with a sand/cement ratio of s/c=2.2. The water/inorganic binder ratio was 0.42. The additive (inventive or comparative) was added in powdered form in an amount by weight of inorganic binder summarized in Table 2. Mixing procedure was according to example 1. Components, dosages and water/cement ratios (W/C) are given in table 2. The results of the mortar test are given in table 3.

TABLE 2

| Exp. | Dispersant no. | Dos [%] | Additive no. | Dos [%] | Additional additive | Dos [%] | Additional dispersant no. | Dos [%] | W/C |
|---|---|---|---|---|---|---|---|---|---|
| 1 | 2 | 0.04 | 1 | 0.25 | Propylene carbonate | 0.25 | 1 | 0.125 | 0.42 |
| 2 | 2 | 0.04 | 1 | 0.25 | Ethylenecarbonate | 0.25 | 1 | 0.125 | 0.42 |
| 3 | 2 | 0.04 | 1 | 0.25 | Glycerol carbonate | 0.25 | 1 | 0.125 | 0.42 |
| 4 | 2 | 0.07 | 1 | 0.25 | Sodium carbonate | 0.50 | 1 | 0.125 | 0.42 |
| 5 | 2 | 0.04 | 1 | 0.25 | Boric acid | 0.25 | 1 | 0.125 | 0.42 |
| 6 | 3 | 0.04 | 1 | 0.25 | Propylene carbonate | 0.25 | 1 | 0.125 | 0.42 |
| 7 | 4 | 0.04 | 1 | 0.25 | Propylene carbonate | 0.25 | 1 | 0.125 | 0.42 |
| 8 | 5 | 0.04 | 1 | 0.25 | Propylene carbonate | 0.25 | 1 | 0.125 | 0.42 |
| 9 | 5 | 0.40 | 0 | 0 | 0 | 0 | 0 | 0 | 0.42 |
| 10 | 2 | 0.23 | 0 | 0.00 | 0 | 0.00 | 0 | 0. | 0.42 |
| 11 | 2 | 0.04 | 1 | 0.25 | Tartaric acid | 0.25 | 1 | 0.125 | 0.42 |
| 12 | 2 | 0.04 | 1 | 0.25 | HEDP | 0.25 | 1 | 0.125 | 0.42 |
| 13 | 2 | 0.04 | 1 | 0.25 | Citric acid | 0.25 | 1 | 0.125 | 0.42 |
| 14 | 2 | 0.04 | 1 | 0.25 | Sodium Gluconate | 0.25 | 1 | 0.125 | 0.42 |

TABLE 3

Results of mortar tests:

| Experiment | Spread cm | | | | 24 h Strength [MPa] | |
|---|---|---|---|---|---|---|
| | 4 min | 10 min | 30 min | 60 min | bending | compressive |
| 1 | 28.3 | 27.3 | 25 | 20.2 | 3.17 | 15.08 |
| 2 | 27.8 | 26.3 | 22.5 | 17.1 | 3.20 | 16.43 |
| 3 | 28.3 | 27.8 | 27.6 | 18.2 | 3.58 | 19.41 |
| 4 | 23.1 | 24.6 | 25.3 | solid | 3.90 | 19.63 |
| 5 | 24.7 | 24.8 | 25.5 | 22.4 | 0.80 | 11.57 |
| 6 | 27.4 | 27.1 | 21.7 | 18.7 | 2.80 | 14.46 |
| 7 | 27.6 | 27.8 | 25.4 | 18.8 | 3.19 | 16.18 |
| 8 | 27.5 | 27.1 | 21.7 | 19.1 | 2.97 | 16.91 |
| 9 | 25.3 | 26.4 | 26.5 | 25.5 | 2.10 | 11.95 |
| 10 | 23.9 | 20.8 | 17.8 | 17.3 | 4.94 | 18.82 |
| 11 | 22.7 | 23.3 | 24.6 | 23.9 | 1.03 | 3.00 |
| 12 | 20.1 | 19.1 | 18.6 | 17.4 | n.d. | n.d. |
| 13 | 25.9 | 25.9 | 23.7 | solid | 2.16 | 11.38 |
| 14 | 28.2 | 27.6 | 27.4 | 27.1 | n.d. | n.d. |

EXAMPLE 3

The strength development within the first day was determined in the composition of experiments 1 and 10 of example 2 (EXP 1 and 10) using cement 3 instead of cement 2. The results are given in table 4.

TABLE 4

| | Spread [cm] after | | Compressive strength [MPa] | | | |
|---|---|---|---|---|---|---|
| | 40 min | 50 min | 4 h | 6 h | 1 d | 7 d |
| EXP 1 | 0 | 2.5 | 5.4 | 5.7 | 33.4 | 62.5 |
| EXP 10 | 0 | 0 | 0 | 0.975 | 42.5 | 61.5 |

The inventive additive (EXP 1) results in an improved early strength formation especially in a time period below 24 hours whereas the mixture without the inventive additive shows a very slow strength formation in the comparable time period.

EXAMPLE 4

For experiments 15-18 cement 2 was used as inorganic binder. The cement mortar investigated was composed with a sand (norm sand)/cement ratio of s/c=2.2. The water/inorganic binder ratio was 0.42. The additive (inventive or comparative) was added in powdered form in an amount by weight of inorganic binder summarized in Table 5. Mixing procedure was according to example 1. Components and dosages are given in table 5. The results of the mortar test are given in table 6.

TABLE 5

| Experiment | Dispersant | Additive |
|---|---|---|
| 15 | PNS 1% | — |
| 16 | PNS 0.3% | 0.3% |
| 17 | Ligninsulfonate 1.1% | — |
| 18 | Ligninsulfonate 0.5% | 0.3% |

PNS: Polynaphthalene sulfonate (Melcret 500, available from BASF Construction Solution GmbH);

The used additive was additive 1, ethylene carbonate and dispersant 1 in the weight ratio of 1:1:0.5.

TABLE 6

| Experiment | Spread [cm] after | | | | Initial Set [min] | Compressive strength [MPa] 1 d |
|---|---|---|---|---|---|---|
| | 10 min | 20 min | 30 min | 60 min | | |
| 15 | 25.5 | 24.9 | 24.6 | 22.4 | 465 | 23 |
| 16 | 25.7 | 24.9 | 23.3 | — | 68 | 28 |

TABLE 6-continued

| Experiment | Spread [cm] after | | | | Initial Set [min] | Compressive strength [MPa] 1 d |
|---|---|---|---|---|---|---|
| | 10 min | 20 min | 30 min | 60 min | | |
| 17 | 17.8 | 18.5 | 18.6 | 16.7 | 787 | 12 |
| 18 | 20.4 | 20.8 | 22.3 | — | 71 | 19 |

From the results can be seen that the addition of the additive of the invention provides sufficient open time, an early setting and high 1d strength.

EXAMPLE 5

The experiments in this example illustrate the use of the additive of the invention in different cementitious systems containing limestone powder or slag.

The cement mortar investigated was composed of 25 wt.-% inorganic binder and 75 wt.-% norm sand (according EN 196-1). For experiments 19, 20 and 23, a binder mixture of 35% of Portland Cement (CEM I 42,5R) and 65% of ground slag (Blaine 4000) was used. For experiments 21, 22 and 24, a mixture of 70% Portland Cement (CEM I 42,5R) and 30% limestone powder was used. Components, dosages and water/cement ratios (WIC) are given in table 7. The results of the mortar tests are given in table 8.

TABLE 7

| Exp. | Dispersant no. | Dos [%] | Additive no. | Dos [%] | Additional additive | Dos [%] | Additional dispersant no. | Dos [%] | W/C |
|---|---|---|---|---|---|---|---|---|---|
| 19 | 2 | 0.04 | 1 | 0.11 | Ethylene carbonate | 0.11 | 1 | 0.075 | 0.42 |
| 20 | 2 | 0.142 | — | . — | — | 0.00 | — | 0.000 | 0.42 |
| 21 | 2 | 0.04 | 2 | 0.11 | Ethylene carbonate | 0.11 | 1 | 0.075 | 0.42 |
| 22 | 2 | 0.15 | — | . — | — | . — | — | 0.000 | 0.42 |
| 23 | 2 | 0.04 | 1 | 0.11 | Sodium carbonate | 0.25 | 1 | 0.075 | 0.42 |
| 24 | 2 | 0.04 | 1 | 0.11 | Sodium carbonate | 0.25 | 1 | 0.075 | 0.42 |

TABLE 8

| | Spread in cm after | | | | | Compressive strength MPa | | | |
|---|---|---|---|---|---|---|---|---|---|
| | 10 min | 20 min | 30 min | 60 min | Initial Set [min] | 1 d strength | 2 d strength | 7 d strength | 28 d strength |
| 19 | 25.5 | 24.9 | 24.9 | — | 51 | 2 | 13 | 32 | 62 |
| 20 | 25.7 | 18.0 | 17.1 | — | 598 | — | 13 | 31 | 61 |
| 21 | 23.4 | 23.3 | — | — | 49 | 13 | | 39 | 50 |
| 22 | 23.7 | 18.7 | — | — | 301 | 13 | | 39 | 50 |
| 23 | 25.5 | 25.8 | — | — | 23 | 1 | 14 | 31 | 51 |
| 24 | 25.4 | 25.3 | 27.3 | — | 88 | 13 | | 39 | 50 |

EXAMPLE 6 (COMPARATIVE EXPERIMENTS)

The experiments were designed to provide a comparison with the use of the bisulfite adduct of glyoxal as described in JP S546013 A1 and FR 2 471 955 A1. The composition of the tested mortar mixtures is given in table 9. The dosage of the additive 1 was adapted to achieve in mixture CR4 an initial stiffening time (100 g cone) of 60 min±15 min. This identified dosage of additive 1 was then used for all other mixtures to identify the effect of the different additives at constant dosage.

For characterization of the mortars the parameters were determined as follows:
1. The setting time was determined according to the standard DIN EN 196-3. Begin of setting and final setting was determined with a 100 g cone (0.5 mm$^2$) at 23° C./50% relative humidity. The setting time is difference between finale setting and initial setting.
2. Compressive strength: Fresh mortar is filled into a polystyrene form to produce 4×4×16 cm mortar prisms: The form is covered and stored at 23° C./50% relative humidity for the desired time after which the compressive strength is to be determined: The compressive strength is then measured on the prisms, for example after 24 h.

TABLE 9

Mortar Composition (values in wt.-% by weight of the sum of mortar components)

| Experiment<br>Type | CR1<br>Ref. | CR2<br>Inv. | CR3<br>Comp | CR4<br>Inv. | CR5<br>Comp | CR6<br>Inv. | CR7<br>Comp |
|---|---|---|---|---|---|---|---|
| Composition | | | | | | | |
| Cement 4 | 20.00 | 20.00 | 20.00 | 20.00 | 20.00 | 20.00 | 20.00 |
| Quartz sand 0.3-1.0 mm | 69.92 | 69.90 | 69.90 | 69.89 | 69.89 | 69.86 | 69.86 |
| Limestone Powder[1] | 10.00 | 10.00 | 10.00 | 10.00 | 10.00 | 10.00 | 10.00 |
| Cellulose Ether[2] | 0.07 | 0.07 | 0.07 | 0.07 | 0.07 | 0.07 | 0.07 |
| Foaming agent[3] | 0.01 | 0.01 | 0.01 | 0.01 | 0.01 | 0.01 | 0.01 |
| Ethylene Carbonate | | | | 0.17 | 0.17 | | |
| Sodium Carbonate | | | | | | 0.4 | 0.4 |
| Additive 1 | | 0.17 | | 0.17 | | 0.17 | |
| Additive 3 | | | 0.17 | | 0.17 | | 0.17 |
| Sum mortar component | 100.00 | 100.00 | 100.00 | 100.00 | 100.00 | 100.00 | 100.00 |
| Water | 15.5 | 15.5 | 15.5 | 15.5 | 15.5 | 15.5 | 15.5 |

[1]Omyacarb 15 AL (Omya)
[2]Methylcellulose Culminal C 4053 (Ashland)
[3]Loxanol K12P (BASF)

TABLE 10

Results of mortar test

| Experiment<br>Type | CR1<br>Ref. | CR2<br>Inv | CR3<br>Comp | CR4<br>Inv | CR5<br>Comp | CR6<br>Inv | CR7<br>Comp |
|---|---|---|---|---|---|---|---|
| Initial Setting (min) | 234 | 29 | 572 | 74 | 32 | 52 | 109 |
| Final Setting (min) | 474 | 682 | n.m. | 154 | 735 | 113 | 4023 |
| Setting time (min) | 240 | 653 | >3500 | 80 | 703 | 61 | 3914 |
| Compressive strength (in MPa) | | | | | | | |
| After 24 h | | 1.7 | 1.1 | n.m. | 2.1 | n.m. | 2.4 | n.m. | n.m.-not measureable (prism was too soft for measurement or was broken before measurement).

CR2 (inventive) shows an early initial setting whereas CR3 (comparative, prior art) shows strong retardation of initial setting which is not the target of the invention. CR3 shows no final setting within 8 hours in opposite to CR2 where the final setting is only-slightly retarded compared to the reference. The examples of the invention show that the addition of the additive of the invention (CR2, CR4, CR6) provides a sufficient open time and a short setting time whereas comparative samples show a significant longer setting time. Additionally all mortars containing inventive additive 1 show a compressive strength after 24 h whereas the compressive strength of all comparative examples with additive 2 could not be determined (prism where to soft and could not be measured).

EXAMPLE 7: SELF LEVELLING UNDERLAYMENT (SLU)

TABLE 11

Components used in SLU mortar

| Type | Component | Supplier |
|---|---|---|
| Binder | Fondu (High Alumina Cement, HAC) | Kerneos |
| Binder | β-hemihydrate | Knauf |
| Binder | Cement A (Ordinary Portland Cement), CEM I 52.5N, Blaine value: 4100 cm$^2$/g | HeidelbergCement AG |
| Filler | Quartz sand H33 | Quarzwerke Frechen |
| Filler | Limestone powder (Omyacarb 15 AL) | Omya |

TABLE 11-continued

Components used in SLU mortar

| Type | Component | Supplier |
|---|---|---|
| Additive | Sodium Carbonate (Soda light) | BASF |
| Additive | Diutan Gum (Vicosity modifying agent) | CP Kelko |
| Additive | Defoamer (Vinapor DF 9010) | BASF Construction Solutions GmbH |
| Additive | redispersible polymer powder (ethylene-vinylacetate polymer) (Vinnapas 5028 E) | Wacker |

The constructions chemical composition according to the invention was used for a composition of a self levelling underlayment (SLU). The compositions of the different mortars are summarized in table 12:

The water content relates to the total sum of mortar components given in table 12.

The dry compositions given in table 12 were mixed with the amount of water (given in table 12) according to EN 1937 (mixing procedure with waiting time).

| Mixing procedure: (Mortar mixer according EN196-1) | | |
|---|---|---|
| Time after start | Duration | Description |
| 0' 00" | | |
| 0' 00"-0' 20" | 20 s | Addition of powder and dispersants to the water |
| 0' 20"-1' 20" | 60 s | Stirring (140 U/min) |
| 1' 20"-1' 40" | 20 s | Clean mixer and bowl |
| 1' 40"-2' 40" | 60 s | Stirring (285 U/min) |
| 2' 40"-7' 40" | 300 s | Ripening time |
| 7' 40"-7' 55" | 15 s | Stirring (285 U/min) |

Production Additive CP1 (According to the Invention):

Cement A, Dispersant 1, Dispersant 4, Additive 1 and sodium carbonate were mixed together in amounts according to table 12 in a knife mill GrindoMix GM 200 (Retsch) for 1 min at 3000 rpm.

| Component | Weight (g) |
|---|---|
| Cement A | 25.94 |
| Dispersant 1 | 7.78 |
| Dispersant 4 | 14.41 |
| Additive 1 | 28.82 |
| Sodium Carbonate | 23.05 |

The constituents of the tested compositions are given in table 12 and the test results are given in table 13.

TABLE 12

Mortar composition for a SLU composition (values are given in wt.-% by weight of the sum of mortar components).

| Composition | SLU1 | SLU2 | SLU3 |
|---|---|---|---|
| Type | Comp | Inv | Ref |
| Component | (%) | (%) | (%) |
| Cement A | 31.59 | 31.50 | 31.59 |
| Fondu (HAC) | 3.51 | 3.51 | 3.51 |
| β-hemihydrate | 1.4 | 1.4 | 1.4 |
| Limestone powder | 19.23 | 19.23 | 19.23 |
| Quartz sand H33 | 41.90 | 41.98 | 41.98 |
| Latex Powder | 2 | 2 | 2 |
| Dispersant 1 | 0.050 | | 0.050 |
| Dispersant 2 | 0.027 | | 0.027 |
| Sodium Carbonate | 0.1 | | 0.1 |
| Additive CP1 | | 0.347 | |
| Additive 2 (tartaric acid) | 0.1 | | |
| Diutan Gum | 0.04 | 0.04 | 0.04 |
| Defoamer (Vinapor DF9010) | 0.064 | 0.064 | 0.064 |
| Sum mortar components | 100 | 100 | 100 |
| Water | 20 | 20 | 20 |

TABLE 13

Results of mortar testing of compositions from table 11

| Composition | | SLU1 | SLU2 | SLU3 |
|---|---|---|---|---|
| Test method | Unit | Inv | Ref | Ref |
| Flow after (according to DIN EN 12706) | | | | |
| 8 min | cm | 15.9 | 15.8 | 8 |
| 15 min | cm | 15.3 | 15.2 | 5.2 |
| 30 min | cm | 13.7 | 13 | — |
| 45 min | cm | 7.0 | 10.5 | — |
| 60 min | cm | 3.0 | 6.4 | — |
| Setting (according to DIN EN 196-3) | | | | |
| Initial Setting | min | 114 | 113 | 91 |
| Final Setting | min | 152 | 141 | 176 |
| Shore D (according to DIN 53505) | | | | |
| 3 | h | 8 | 13 | 0 |
| 4 | h | 16 | 17 | 10 |
| 5 | h | 20 | 23 | 13 |
| 6 | h | 23 | 25 | 16 |
| 7 | h | 26 | 27 | 21 |
| Compressive strength after (according to DIN EN 196-1) | | | | |
| 1 d | MPa | 10.9 | 10.3 | 13.1 |

The additive CP1 used in SLU2 contains the bisulfite adduct according to the invention. Compared to the reference SLU1 in mortar SLU2 shows a longer constant flow over time which is the main benefit. SLU2 shows an improved early strength development (Shore D value) compared to SLU1. SLU3 is a comparative formulation without use of any additive influencing the hydration of the cementitious material. SLU3 shows a bad flow behavior over time and Shore D development compared to SLU2.

The invention claimed is:

1. A construction chemical composition, comprising a bisulfite adduct of glyoxylic acid or a salt or mixed salt thereof and an inorganic binder.

2. The construction chemical composition of claim 1, wherein the bisulfite adduct is of formula (I):

wherein:

R1 is —COOX; and

X is, independently of one another, H or a cation equivalent $K_a$ wherein K is selected from the group consisting of an alkali metal, alkaline earth metal, zinc, iron, ammonium, or phosphonium cation, as mixtures thereof, and a is 1/n wherein n is the valence of the cation.

3. The construction chemical composition of claim 1, wherein X is H, Na, K, Li or mixtures thereof.

4. The construction chemical composition of claim 1, wherein the inorganic binder is selected from the group consisting of a hydraulic binder, a calcium sulfate-based binder, and a mixture thereof.

5. The construction chemical composition of claim 4, wherein the hydraulic binder is an aluminate-containing cement.

6. The construction chemical composition of claim 5, wherein the aluminate-containing cement is selected from the group consisting of a CEM cement, an aluminate cement, a sulfoaluminate cement, and mixtures thereof.

7. The construction chemical composition of claim 6, wherein the aluminate-containing cement is CEM cement.

8. The construction chemical composition of claim 5, wherein the aluminate-containing cement is a mixture of CEM cement and aluminate cement, or a mixture of CEM cement and sulfoaluminate cement, or a mixture of CEM cement, high alumina cement and sulfoaluminate cement.

9. The construction chemical composition of claim 4, wherein the inorganic binder is calcium sulfate dihydrate, calcium, sulfate hemihydrate or anhydrite and mixtures thereof.

10. The construction chemical composition of claim 5, wherein the inorganic binder is a mixture of an aluminate-containing cement and a calcium sulfate-based binder.

11. The construction chemical composition of claim 1, further comprising at least one additive.

12. The construction chemical composition of claim 11, wherein at least one additive is selected from the group consisting of inorganic carbonates, alkali metal sulfates, latent hydraulic binders, dispersants, hardening accelerators, hardening retarders, fillers, essentially aluminate-free cement, and aggregates or a mixture of two or more thereof.

13. The construction chemical composition of claim 12, wherein the additive is at least one polymeric dispersant, phosphorylated polycondensation product or a sulfonic acid and/or sulfonate group containing dispersant.

14. The construction chemical composition of claim 13, wherein the dispersant is a sulfonic acid and/or sulfonate group containing a dispersant selected from the group consisting of lignosulfonates, melamine formaldehyde sulfonate condensates, β-naphthalene sulfonic acid condensates, sulfonated ketone-formaldehyde-condensates, and copolymers comprising sulfo group containing units and/or sulfonate group-containing units.

15. The construction chemical composition of claim 12, wherein the additive is selected from the group consisting of essentially aluminate-free cement, fillers, and aggregates or a mixture of two or more thereof.

16. The construction chemical composition of claim 12, wherein the inorganic carbonate is an alkali metal carbonate or alkaline earth metal carbonate.

17. The construction chemical composition of claim 12, wherein the additive is a hardening retarder.

18. The construction chemical composition of claim 1, wherein the weight ratio of the inorganic binder to the bisulfite adduct is in the range from 10:1 to 10000:1.

19. The construction chemical composition of claim 1, wherein the weight ratio of the inorganic binder to the bisulfite adduct is in the range from 1:10 to 1:10000.

20. A building product, comprising the construction chemical composition of claim 1.

21. The building product of claim 20, wherein a weight ratio of the inorganic binder to the bisulfite adduct is in the range from 10:1 to 1000:1.

* * * * *

UNITED STATES PATENT AND TRADEMARK OFFICE
CERTIFICATE OF CORRECTION

PATENT NO. : 10,723,656 B2
APPLICATION NO. : 16/308122
DATED : July 28, 2020
INVENTOR(S) : Torben Gaedt et al.

It is certified that error appears in the above-identified patent and that said Letters Patent is hereby corrected as shown below:

In the Specification

Column 1, Line 16, "no 3151" should read -- n° 3161 --; and
    Line 56, "motar" should read -- mortar --.

Column 2, Line 9, "calciumsulfate" should read -- calcium sulfate --;
    Line 16, "calciumsulfate" should read -- calcium sulfate --;
    Line 28, "In particular" should read -- In particular, --; and
    Lines 35-36, "In particular" should read -- In particular, --.

Column 3, Line 15, "calciumsulfate dihydrate, calcium sulfate" should read -- calcium sulfate dihydrate, calcium sulfate --;
    Line 51, "phases:" should read -- phases --; and
    Line 52, "($C_AA$)," should read -- ($C_3A$), --.

Column 4, Line 32, "carbonate." should read -- carbonate --.

Column 5, Line 6, "MgO;" should read -- MgO, --.

Column 6, Line 1, "dispersant" should read -- dispersant, --.

Column 10, Line 5, "EP2463314;" should read -- EP2463314, --;
    Line 11, "cormprising" should read -- comprising --; and
    Line 50, "Generally" should read -- Generally, --.

Column 12, Line 65, "weight M," should read -- weight $M_w$, --.

Column 15, Line 6, "calciumsulfate" should read -- calcium sulfate --;
    Line 23, "methylhydroxypropylcelluose" should read -- methylhydroxypropylcellulose --; and
    Line 66, "w-L-%-5.0" should read -- wt.-%-5.0 --.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,723,656 B2

Column 16, Line 6, "anhydrite" should read -- anhydrite, --;
    Line 19, "thereof;" should read -- thereof, --;
    Line 26, "1199" should read -- 1/99 --;
    Line 33, "thereof; and" should read -- thereof, and --;
    Line 41, "1199 1 to 9911," should read -- 1/99 to 99/1, --;
    Line 48, "thereof;" should read -- thereof, --;
    Line 50, "anhydrite;" should read -- anhydrite, --; and
    Line 59, "10011" should read -- 100/1 --.

Column 18, Line 5, "19770071518;)" should read -- 19770071518). --.

Column 19, under Table 2, Line 5, "Ethylenecarbonate" should read -- Ethylene carbonate --.

Column 21, Line 32, "(WIC)" should read -- (W/C) --.

Column 24, under Table 11, Line 55, "(Vicosity" should read -- (Viscosity --.

Column 24, under Table 11, Line 59, "vinylacetate" should read -- vinyl acetate --.

In the Claims

Column 26, Claim 2, Line 56, "as mixtures" should read -- and mixtures --.

Column 27, Claim 9, Line 14, "calcium," should read -- calcium --.